June 26, 1928.
C. C. FARMER
PISTON RING
Filed Jan. 28, 1927
1,674,770
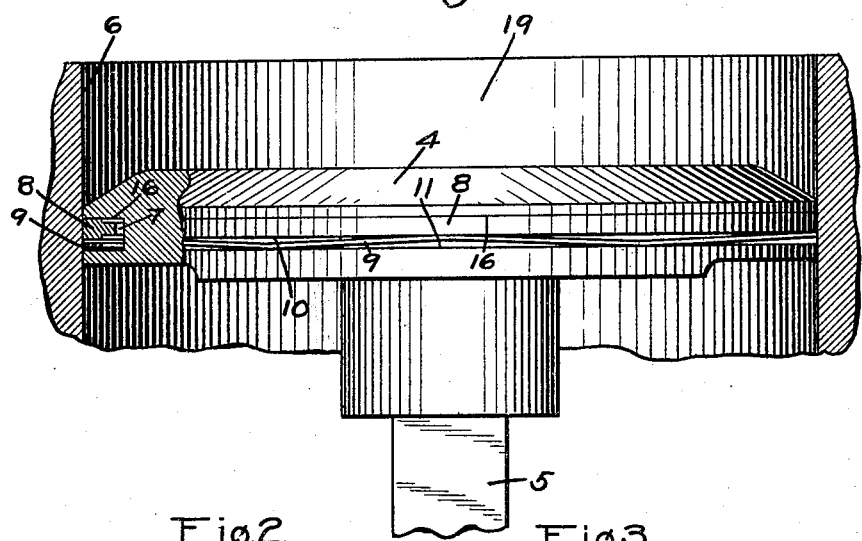
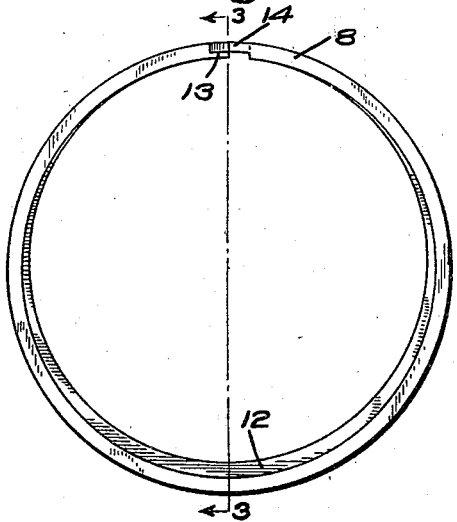
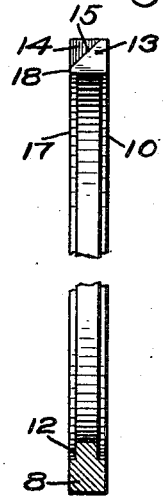
INVENTOR
CLYDE C. FARMER
BY *Wm. M. Cady*
ATTORNEY Patented June 26, 1928.

1,674,770

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON RING.

Application filed January 28, 1927. Serial No. 164,220.

This invention relates to piston packing rings and more particularly to a piston packing ring adapted to prevent the flow of fluid pressure from one side of a piston to the opposite side.

Where a piston is employed which is subject to movement due to a difference in fluid pressures on the opposite sides of the piston, it is the usual practice to employ a piston packing ring, which is fitted into a groove formed in the periphery of the piston and is adapted to expand against the cylinder wall to prevent leakage between the outer periphery of said ring and the cylinder wall. The ring fits in the peripheral groove in the piston sufficiently tight to prevent leakage and at the same time permit expansive movement of the ring.

Dirt or gummy oil, in the fluid under pressure acting on the piston, tends to collect around the piston and piston ring and work in between the sides of the ring and the side walls of the peripheral groove, thus tending to bind the ring, so that as wear between the engaging surfaces of the ring and cylinder wall takes place, the ring is unable to expand and maintain a pressure against the cylinder wall.

The principal object of my invention is to provide an improved piston packing ring construction adapted to overcome the above difficulty.

In the accompanying drawing; Fig. 1 is a sectional view of a cylinder and containing a piston provided with a piston packing ring of the construction embodying my invention; Fig. 2, a front elevation of the piston packing ring shown in Fig. 1; and Fig. 3 a section on the line 3—3 of Fig. 2.

In Fig. 1 of the drawing is shown a piston 4 having the usual piston stem 5, said piston having a loose fit in a cylinder 6. The piston 4 is provided with an annular groove 7, into which is fitted a piston packing ring 8.

According to my invention, the width of the annular ring groove 7 is made substantially greater than the thickness of the piston packing ring 8, and the ring is held in leak tight engagement with one of the side walls 16 of the ring groove by a spring, such as the corrugated spring ring 9. Said ring is adapted to be inserted under compression between the side wall 10 of said ring and the side wall 11 of the groove.

This piston packing ring is, preferably, of an improved design, such as disclosed in my prior application, Serial No. 138,616, filed September 30, 1926.

The ring is question is of the eccentric type and is so counterbored as to provide a side wall bearing face of uniform width. At the joint, the ring is provided with end sections 13 and 14, adapted to overlap and engage inclined faces, the inclined face 15 of the section 13 adapted to engage a corresponding inclined face of the section 14.

In operation, the piston packing ring is inserted in the annular piston ring groove 7, with the face 17 of said ring toward wall 16 of the annular groove 7, and then the corrugated spring ring 9 is inserted between the wall of the groove and the side wall 10 of the ring. The compressive force of the corrugated ring 9 constantly presses the piston packing ring 8 into leak-tight engagement with the side wall 16 of the piston ring groove. With the piston packing ring 8 expanded against the cylinder wall 6 and with the leak-tight ring joint, the flow of fluid under pressure from one side of the piston 4 to the opposite side of said piston is prevented.

If dirt, gummy oil or other such foreign matter collects in the piston ring groove 7 and on the side walls of said groove, the ring will not jam or stick so as to prevent expansion, since the piston ring can yield to lateral movement in the groove and the resistance to expansive movement will not exceed that due to the spring pressure of the spring ring 9.

In case the side walls of the piston packing ring 8 become worn, uniform width of bearing surfaces of the ring in the groove are retained and thereby an equalized resistance to expansion is maintained, which tends to better insure a leak-tight engagement between the cylinder wall and the piston ring.

As wear of the cylinder wall 6 and the engaging surface of the piston packing ring 8 takes place, the tight engagement between said wall and ring is maintained by the expansion of the ring, with a consequent opening up of the ring joint. In opening, the sections 13 and 14 of the ring separate by sliding over each other on the engaging inclined surfaces, but with the face 17 of said ring engaging side wall 16 of the piston groove, a leak proof joint is still maintained, since both sections 13 and 14 are provided with faces engaging the wall 16 of the piston groove, which effectively prevents the flow of fluid past the piston at the ring joint.

The spring ring 9 is so constructed that the pressure exerted on the piston ring will be sufficient to maintain the piston ring in engagement with the wall 16 against the force tending to move the ring away from the wall 16 as set up by the frictional resistance between the cylinder wall 6 and the periphery of the piston ring.

Having now described my invention, what I claim as new and desire to secure by Letters Patent, is:—

1. The combination with a piston having an annular groove, of a piston packing ring mounted in said groove, and having the inner periphery eccentric to the outer periphery and counterbored to provide a bearing face of uniform width, and spring means mounted in said groove and adapted to engage said ring and maintain said bearing face of the ring in engagement with one of the side walls of said groove.

2. The combination with a piston having an annular groove, of a piston packing ring mounted in said groove, and having the inner periphery eccentric to the outer periphery and counterbored to provide a bearing face of uniform width and having overlapping sections provided with bearing faces adapted to engage one of the side walls of the groove, and spring means mounted in said groove and adapted to press said ring, so that the bearing faces at one side of the ring are maintained in yielding engagement with one of the side walls of the groove.

In testimony whereof I have hereunto set my hand.

CLYDE C. FARMER.